US011401185B2

United States Patent
Li et al.

(10) Patent No.: US 11,401,185 B2
(45) Date of Patent: Aug. 2, 2022

(54) METHOD AND DEVICE FOR TREATING AMMONIA-NITROGEN WASTEWATER USING MICROBIAL ELECTROLYSIS CELL ASSISTED SANI SYSTEM

(71) Applicant: ZHEJIANG UNIVERSITY, Hangzhou (CN)

(72) Inventors: Zhongjian Li, Hangzhou (CN); Gaoming Wu, Hangzhou (CN); Bin Yang, Hangzhou (CN); Yuxuan Yang, Hangzhou (CN); Lecheng Lei, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/055,998

(22) PCT Filed: Oct. 16, 2018

(86) PCT No.: PCT/CN2018/110409
§ 371 (c)(1),
(2) Date: Nov. 17, 2020

(87) PCT Pub. No.: WO2020/051969
PCT Pub. Date: Mar. 19, 2020

(65) Prior Publication Data
US 2021/0206674 A1    Jul. 8, 2021

(30) Foreign Application Priority Data
Sep. 12, 2018   (CN) .......................... 201811059860.7

(51) Int. Cl.
*C02F 3/00*   (2006.01)
*C02F 3/30*   (2006.01)
(Continued)

(52) U.S. Cl.
CPC .............. *C02F 3/005* (2013.01); *C02F 3/006* (2013.01); *C02F 3/302* (2013.01); *C02F 3/345* (2013.01);
(Continued)

(58) Field of Classification Search
CPC .......... C02F 3/006; C02F 3/302; C02F 3/345; C02F 2103/08; C02F 3/305
See application file for complete search history.

(56) References Cited

U.S. PATENT DOCUMENTS

2013/0256223 A1* 10/2013  Chen ....................... C02F 3/025
                                                              210/205

FOREIGN PATENT DOCUMENTS

| CN | 104743663 A | 7/2015 |
| CN | 105084530 A | 11/2015 |

(Continued)

OTHER PUBLICATIONS

International Search Report (PCT/CN2018/110409); dated Jun. 10, 2019.

*Primary Examiner* — Claire A Norris
(74) *Attorney, Agent, or Firm* — W&G Law Group

(57) ABSTRACT

Disclosed are a method and a device for treating high ammonia-nitrogen wastewater using a microbial electrolysis cell (MEC) assisted SANI system, including an SANI system, an MEC and a power supply. The cathode chamber and anode chamber of the MEC are separated by a separator and are respectively connected to the cathode and anode of the power supply, and a cathode electrode is enriched with hydrogen autotrophic denitrifying bacteria. The cathode chamber has two main functions. Firstly, a higher denitrification efficiency is achieved due to the enriched hydrogen autotrophic denitrifying bacteria; and secondly, the alkalinity produced in the cathode can adjust the pH of the
(Continued)

nitrification chamber. In addition, the cathode chamber can oxidize the residual sulfide in the effluent to meet the discharge standard. This system retains the advantage of less sludge in a SANI process, but also can be applied to the treatment of wastewater with high ammonia-nitrogen.

9 Claims, 6 Drawing Sheets

(51) Int. Cl.
   *C02F 3/34* (2006.01)
   *C02F 101/10* (2006.01)
   *C02F 101/16* (2006.01)

(52) U.S. Cl.
   CPC .... *C02F 2101/101* (2013.01); *C02F 2101/16* (2013.01); *C02F 2201/46115* (2013.01); *C02F 2201/46145* (2013.01); *C02F 2209/02* (2013.01); *C02F 2209/06* (2013.01)

(56) References Cited

FOREIGN PATENT DOCUMENTS

| | | |
|---|---|---|
| CN | 105217796 A | 1/2016 |
| EP | 2925679 B1 | 6/2018 |

* cited by examiner

METHOD AND DEVICE FOR TREATING AMMONIA-NITROGEN WASTEWATER USING MICROBIAL ELECTROLYSIS CELL ASSISTED SANI SYSTEM

CROSS-REFERENCE TO RELATED APPLICATIONS

This is the United States national phase of International Patent Application No. PCT/CN2018/110409, filed on Oct. 16, 2018, which claims priority to Chinese Patent Application No. 201811059860.7, filed on Sep. 12, 2018, the entire contents of which are incorporated herein by reference.

TECHNICAL FIELD

The present application relates to a method and a device for treating ammonia-nitrogen wastewater using a microbial electrolytic cell assisted SANI system, belonging to the field of environmental technology and water treatment.

BACKGROUND

Nowadays, the massive discharge of nitrogen-containing wastewater greatly affects the balance of the ecosystem, especially in the water system, a representative example of which is the red tide caused by eutrophication of water bodies. The traditional biological nitrification and denitrification process is widely used in ammonia treatment. Although some novel technologies, such as the A/O technology, appear constantly, the traditional process has been used because of its advantages of low energy consumption and high efficiency. However, the traditional nitrification and denitrification technology needs addition of additional alkalinity and electron donors, which increases the overall cost consumption. In addition, the traditional nitrification and denitrification process is carried out by heterotrophic denitrifying bacteria consuming organic substrates, so a large amount of sludge will be produced.

In view of these two points, the SANI process has successfully solved the above problems. An SANI process is a process combining sulfate reduction, sulfide autotrophic denitrification and nitrification. The SANI process has successfully treated municipal wastewater in Hong Kong. However, for some industrial wastewater, such as petroleum wastewater, metallurgical wastewater, food industrial wastewater, pharmaceutical wastewater, etc., the N concentration (ammonia concentration and nitrate concentration) is much higher than that of municipal wastewater. For this wastewater, if only SANI process is used for denitrification, the oxidation of high ammonia nitrogen will cause the pH of nitrification chamber to be too low, which will affect the denitrification efficiency of the whole system. Secondly, due to the S/N requirement of the SANI system, it is necessary to have a high S concentration. However, increasing the S concentration in influent water in the SANI process has the following three shortcomings: first, a high concentration of sulfide is harmful to microorganisms; second, a higher S concentration will lead to more $H_2S$ gas being produced in the sulfate reduction process, so more $H_2S$ gas will escape in the whole process; third, a higher S concentration requires more operating costs. Therefore, certain improvements have to be made to use the current SANI process to treat industrial wastewater with high ammonia nitrogen.

As a new technology, the application of a microbial electrolytic cell (MEC) in water treatment has been widely studied in the past ten years. Hydrogen autotrophic denitrifying bacteria can denitrify on the cathode surface of the MEC by using hydrogen produced by the cathode, so the cathode chamber of the MEC can act as a secondary denitrification chamber, thus indirectly reducing the S concentration requirement in the influent of the SANI process. In addition, the MEC cathode produces hydrogen and produces a large amount of alkalinity, while the nitrification process in the nitrification chamber produces a large number of protons. Under suitable conditions, the two can adjust each other to achieve a long-term stability of the pH of the system. Therefore, the e-SANI process, which couples MEC and SANI processes, is expected to become a promising technology for treating high ammonia-nitrogen wastewater.

SUMMARY

According to the present invention, by coupling the MEC and SANI processes, the SANI process is strengthened so as to adapt to the treatment of wastewater with high ammonia-nitrogen. By using the extra electrons and alkalinity provided by the MEC, the denitrification process is additionally carried out and the pH of the nitrification chamber is adjusted, thus achieving the capability of the system to treat wastewater with high ammonia nitrogen.

A device for treating ammonia-nitrogen wastewater using a microbial electrolysis cell assisted SANI system according to the present invention includes an SANI system, a 4# chamber, a 5# chamber and a power supply, the 4# chamber is a cathode chamber of a MEC, the 5# chamber is an anode chamber of the MEC, and the 4# chamber and the 5# chamber are separated by a separator; the cathode chamber and the anode chamber of the MEC are respectively connected to a negative electrode and a positive electrode of the power supply, and a cathode electrode in the cathode chamber is enriched with hydrogen autotrophic denitrifying bacteria; and an outlet of a sulfide autotrophic denitrification chamber of the SANI system is connected to an inlet of the cathode chamber of the MEC; and an outlet of the cathode chamber of the MEC is connected to an inlet of a nitrification chamber of the SANI system.

Preferably, an outlet of the nitrification chamber of the SANI system is connected to the anode chamber of the MEC.

Preferably, the separator is used for isolating the anode and cathode chambers, and can be a proton exchange membrane, a cation exchange membrane or the like.

Further, the 4# chamber is filled with a graphite filler which is led out by a graphite rod to be connected to the power supply, and the 5# chamber uses a DSA electrode.

Further, the 4# chamber is in an anoxic condition, with a dissolved oxygen DO<0.5 mg/L; the 5# chamber is in an aerobic condition, with a dissolved oxygen DO>0.5 mg/L; and the SANI system, the 4# chamber and the 5# chamber are all fully stirred.

The present invention further discloses a method for treating ammonia-nitrogen wastewater by the device, the method including: entering a wastewater through a bottom of a sulfate reduction chamber of the SANI system, and reducing sulfate in the wastewater to sulfide by sulfate reducing bacteria under a condition of complete mixing, during which electrons are sourced from organic matters in the wastewater;

after an effluent from the sulfate reduction chamber reaching the sulfide autotrophic denitrification chamber of the SANI system, fully mixing the effluent with the wastewater flowing back from the nitrification chamber at a bottom of the sulfide autotrophic denitrification chamber;

converting $NH_4^+$ in the wastewater into $NO_3^-$ by nitrifying bacteria in the nitrification chamber so that a large number of $NO_3^-$ exist in the sulfide autotrophic denitrification chamber, and converting $NO_3^-$ into $N_2$ under anaerobic conditions by sulfide autotrophic denitrification microorganisms growing in the chamber, wherein electrons are sourced from sulfide coming from the sulfate reduction chamber; entering an effluent from the sulfide autotrophic denitrification chamber into the cathode chamber of the MEC, and isolating the anode chamber from the cathode chamber by a separator in order to avoid mutual interference between ion migration in the cathode chamber and that in the anode chamber; in the cathode chamber, performing deep denitrification for further denitrification by hydrogen autotrophic denitrifying bacteria, and then flowing an effluent from the cathode chamber through an upper outlet to the nitrification chamber to convert $NH_4^+$ in the water into $NO_3^-$; effectively neutralizing a large number of protons produced during nitrification process in the nitrification chamber by a large number of hydroxyl radicals produced in the cathode chamber along with a hydrogen generating reaction; and finally, directly discharging or pumping an effluent from the nitrification chamber into the anode chamber of the MEC for oxidation treatment to remove sulfide in the water to be directly discharged.

Further, a flow ratio of a water discharging amount of the nitrification chamber to an amount of water flowing back to the sulfide autotrophic denitrification chamber is 1:0.5-1:5.

Further, temperatures of the SANI system, the 4# chamber and the 5# chamber are controlled at 25±5° C., and a hydraulic retention time of each chamber is 18-36 h.

Furthermore, a cathode potential ranges from −0.4 V to −1.2 V.

Furthermore, an anode potential ranges from 0.5 V to 2.3 V.

Compared with the prior art, the present invention has the following beneficial effects:

1) it can be applied to treatment of wastewater with a high ammonia-nitrogen content (≥200 mg $NH_4^+$—N/L);

2) pH self-adjustment can be achieved without additionally adding alkalinity or acidity;

3) the denitrification efficiency is higher; and 4) the sulfide in the effluent is further oxidized and removed using the anode chamber of the microbial electrolytic cell.

DESCRIPTION OF EMBODIMENTS

In order to better understand the present invention, the present invention is further explained below by the drawings and specific examples.

Figure 1:
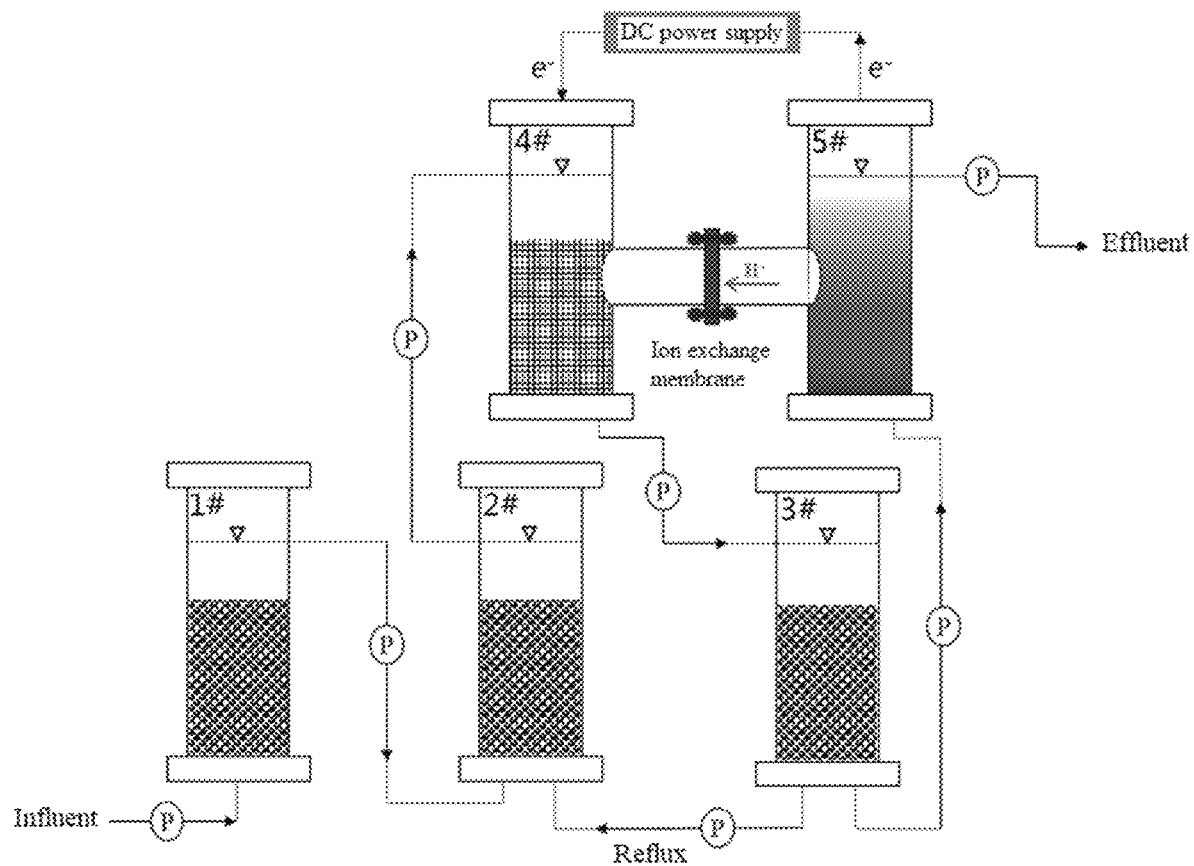
FIG. 1 is a schematic diagram of a device for treating high ammonia-nitrogen wastewater by an e-SANI process.

Referring to FIG. 1, the whole device is operated in a continuous flow. The device for treating ammonia-nitrogen wastewater using a microbial electrolytic cell assisted SANI system comprises an SANI system, a 4# chamber, a 5# chamber and a power supply, the 4# chamber is a cathode chamber of a MEC, the 5# chamber is an anode chamber of the MEC, and the 4# chamber and the 5# chamber are separated by a separator; a cathode chamber and an anode chamber of the MEC are respectively connected to a cathode and an anode of the power supply, and a cathode electrode in the cathode chamber is enriched with hydrogen autotrophic denitrifying bacteria; an outlet of a sulfide autotrophic denitrification chamber (i.e., 2# chamber) of the SANI system is connected to an inlet of the cathode chamber of the MEC; and an outlet of the cathode chamber of the MEC is connected to an inlet of a nitrification chamber (i.e., 3# chamber) of the SANI system.

The process flow for treating ammonia-nitrogen wastewater in the present invention includes: entering a wastewater through a bottom of a sulfate reduction chamber (i.e., 1# chamber) of the SANI system, and reducing sulfate in the wastewater to negative divalent sulfur ions by sulfate reducing bacteria under a condition of complete mixing, during which electrons are sourced from organic substrates in the wastewater;

after an effluent from the sulfate reduction chamber reaching the sulfide autotrophic denitrification chamber of the SANI system, fully mixing the effluent with the wastewater flowing back from the nitrification chamber at a bottom of the sulfide autotrophic denitrification chamber; converting $NH_4^+$ in the wastewater into $NO_3^-$ by nitrifying bacteria in the nitrification chamber so that a large number of $NO_3^-$ exist in the sulfide autotrophic denitrification chamber, and converting $NO_3^-$ into $N_2$ under anaerobic conditions by sulfide autotrophic denitrification microorganisms growing in the chamber, wherein electrons are sourced from sulfide coming from the sulfate reduction chamber; entering an effluent from the sulfide autotrophic denitrification chamber into the cathode chamber of the MEC, and isolating the anode chamber from the cathode chamber by a separator in order to avoid mutual interference between ion migration in the cathode chamber and that in the anode chamber; in the cathode chamber, performing deep denitrification for further denitrification by hydrogen autotrophic denitrifying bacteria, and then flowing an effluent from the cathode chamber through an upper outlet to the nitrification chamber to convert $NH_4^+$ in the water into $NO_3^-$; effectively neutralizing a large number of protons produced during nitrification in the nitrification chamber by a large number of hydroxyl radicals produced in the cathode chamber along with a hydrogen generating reaction; and finally, directly discharging or pumping an effluent from the nitration chamber into the anode chamber of the MEC for oxidation treatment to remove sulfide in the water to be directly discharged.

Example 1

The wastewater treatment object was wastewater with a $NH_4^+$—N concentration of 214.6 mg/L, an $SO_4^{2-}$—S concentration of 200 mg/L and a TOC concentration of 400 mg/L. The initial pH was about 7.0.

The reflux ratio was controlled at 3:1, the hydraulic retention time of each chamber was controlled at 24 h, the operating temperature of the system was controlled at 25±5° C., and the cathode potential was controlled at −0.8 V.

Figure 2:
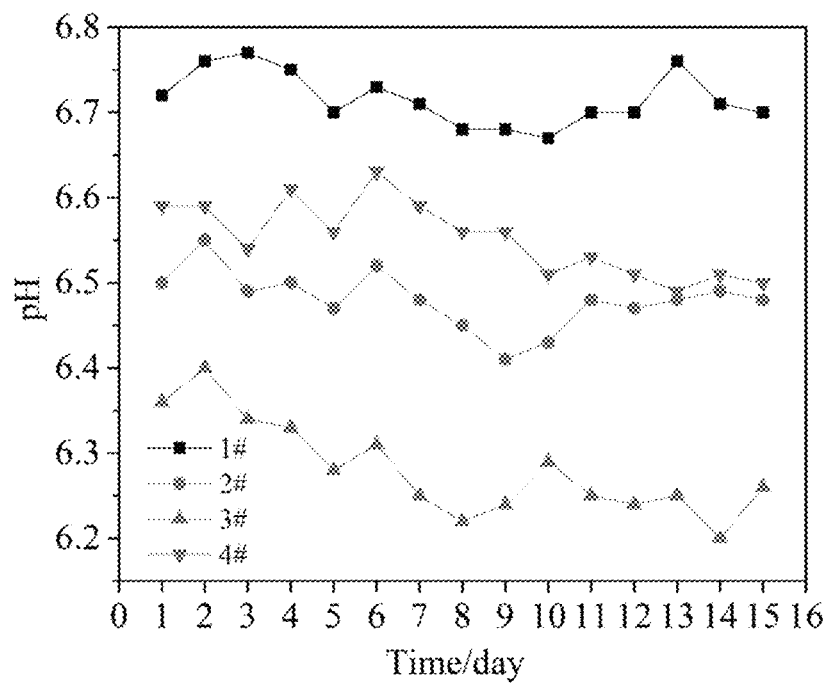
FIG. 2 is a diagram showing the change of pH when the e-SANI process is used to treat high ammonia-nitrogen wastewater at −0.8 V.
Figure 3:
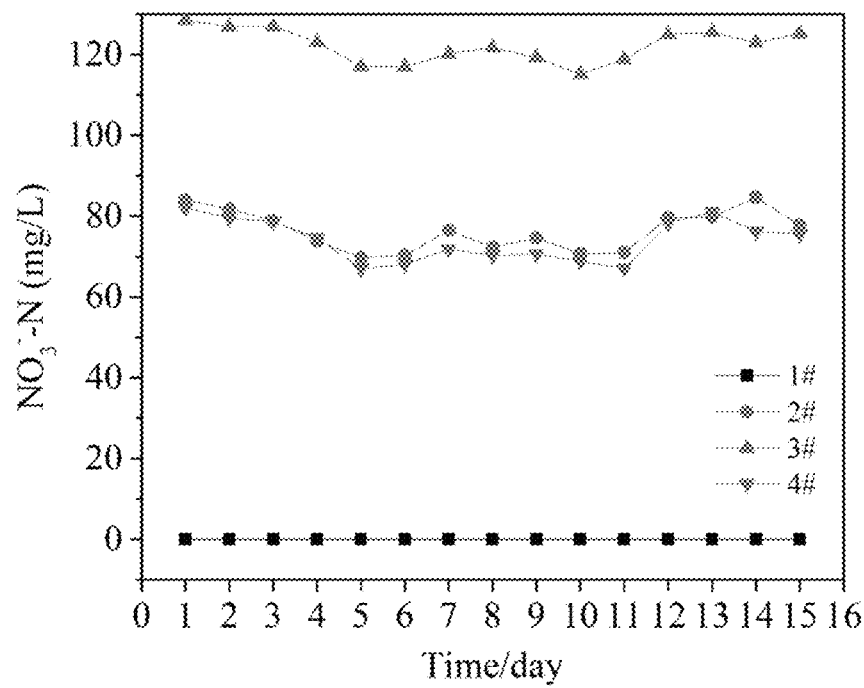
FIG. 3 is a diagram showing change of $NH_4^+$—N when the e-SANI process is used to treat high ammonia-nitrogen wastewater at −0.8 V.
Figure 4:
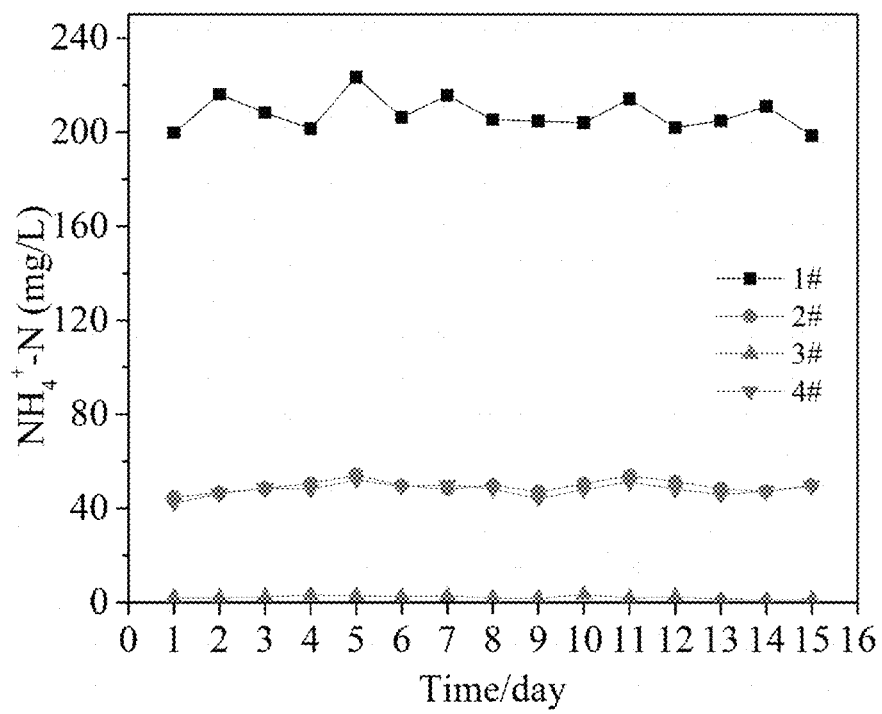
FIG. 4 is a diagram showing the change of $NO_3^-$—N when the e-SANI process is used to treat high ammonia-nitrogen wastewater at −0.8 V.

The results are as shown in FIGS. 2-4. After introducing the MEC, the pH of the 3# nitrification chamber could be stabilized between 6.2 and 6.3, and ammonia nitrogen was almost zero, which indicates that the improvement of pH greatly improves nitrification efficiency. However, the $NO_3^-$—N of 2# and the $NO_3^-$—N of 4# were almost the same, which indicates that the denitrification effect of the 4# chamber is not very significant and needs to be further optimized.

Example 2

The wastewater treatment object was wastewater with a $NH_4^+$—N concentration of 214.6 mg/L, an $SO_4^{2-}$—S concentration of 200 mg/L and a TOC concentration of 400 mg/L. The initial pH was about 7.0.

The reflux ratio was controlled at 3:1, the hydraulic retention time of each chamber was controlled at 24 h, the operating temperature of the system was controlled at 25±5° C., and the cathode potential was controlled at −0.9 V.

Figure 5:
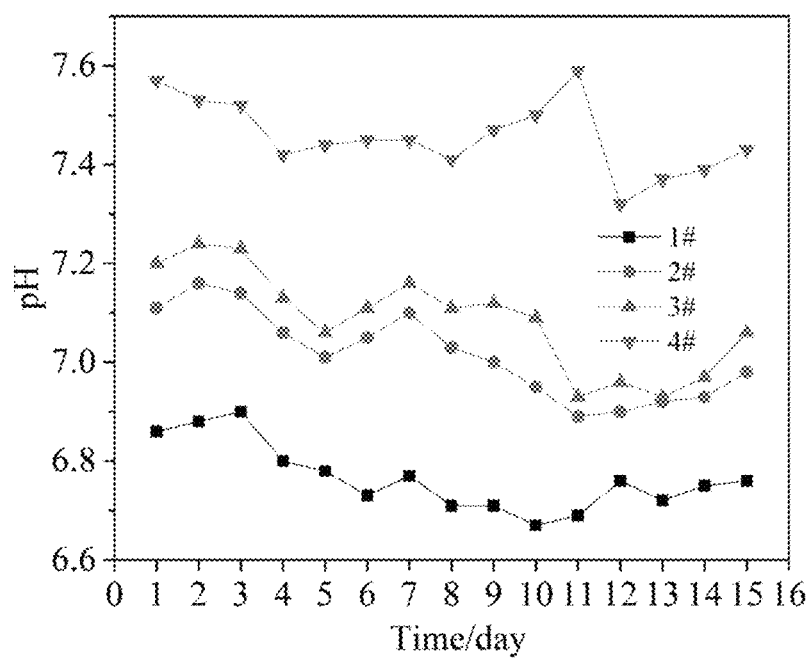
FIG. 5 is a diagram showing the change of pH when the e-SANI process is used to treat high ammonia-nitrogen wastewater at −0.9 V.
Figure 6:
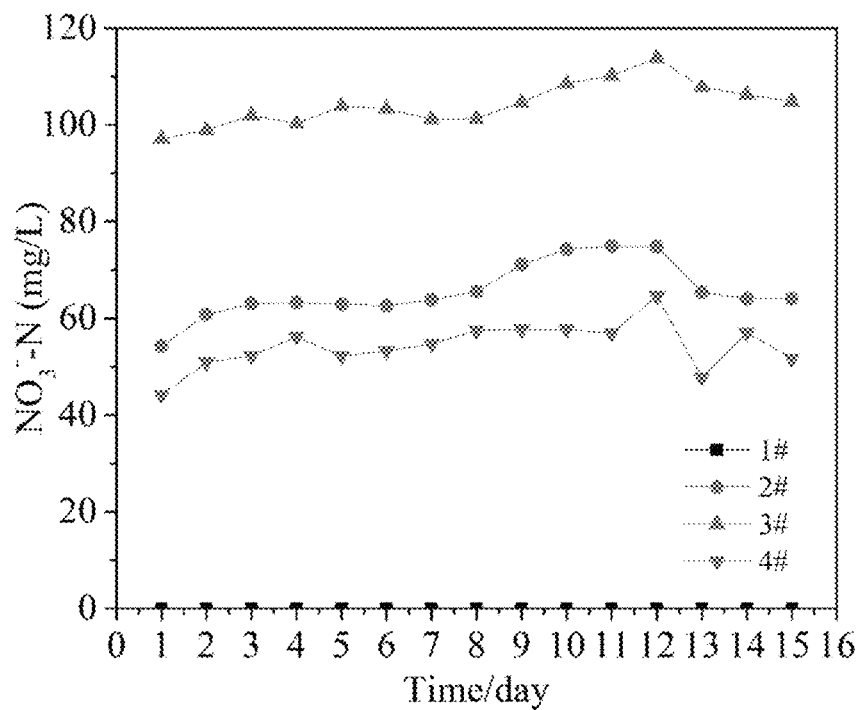
FIG. 6 is a diagram showing the change of $NH_4^+$—N when the e-SANI process is used to treat high ammonia-nitrogen wastewater at −0.9 V.
Figure 7:
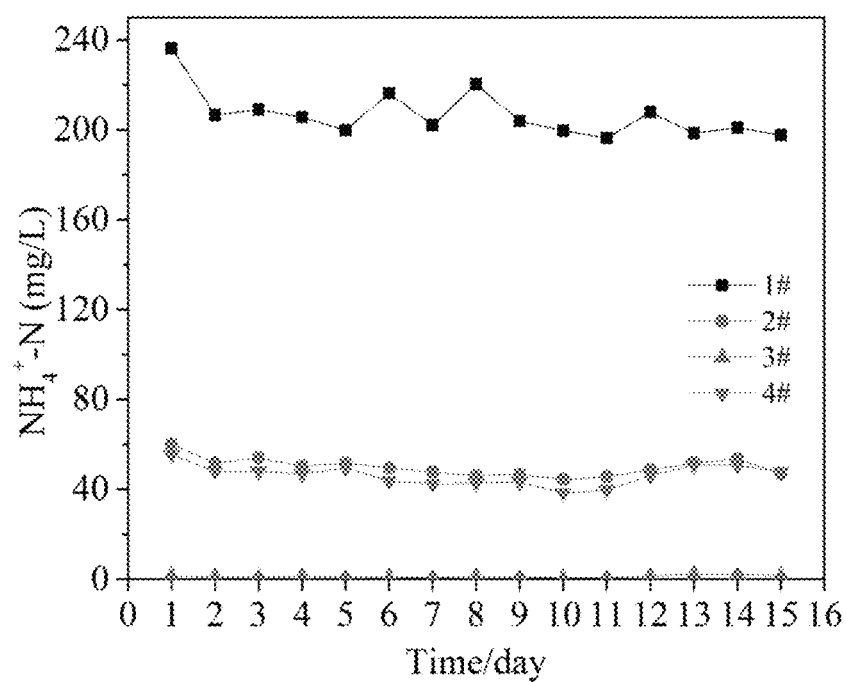
FIG. 7 is a diagram showing the change of $NO_3^-$—N when the e-SANI process is used to treat high ammonia-nitrogen wastewater at −0.9 V.

The results are as shown in FIGS. 5-7. After the cathode potential increased from −0.8 V to −0.9 V, the pH of chambers 2#, 3# and 4# all increased steadily, so that the pH of the effluent could be stabilized between 6.8 and 7.0, which was almost the same as that of the influent, which meant that the whole system could achieve pH self-adjustment under the condition of a cathode potential of −0.9 v, in such a manner that pH of the influent was consistent with pH of the effluent. The ammonia nitrogen in the effluent was almost zero, and the nitrification efficiency was stabilized at about 99%. The difference in $NO_3$—N between 2# and 4# began to be manifested, which indicated that the denitrification effect of the 4# chamber began to be manifested, but there was still potential for further optimization.

Example 3

The wastewater treatment object was wastewater with a $NH4^+$—N concentration of 214.6 mg/L, an $SO_4^{2-}$—S concentration of 200 mg/L and a TOC concentration of 400 mg/L. The initial pH was about 7.0.

The reflux ratio was controlled at 3:1, the hydraulic retention time of each chamber was controlled at 24 h, the operating temperature of the system was controlled at 25±5° C., and the cathode potential was controlled at −1.0 V.

Figure 8:
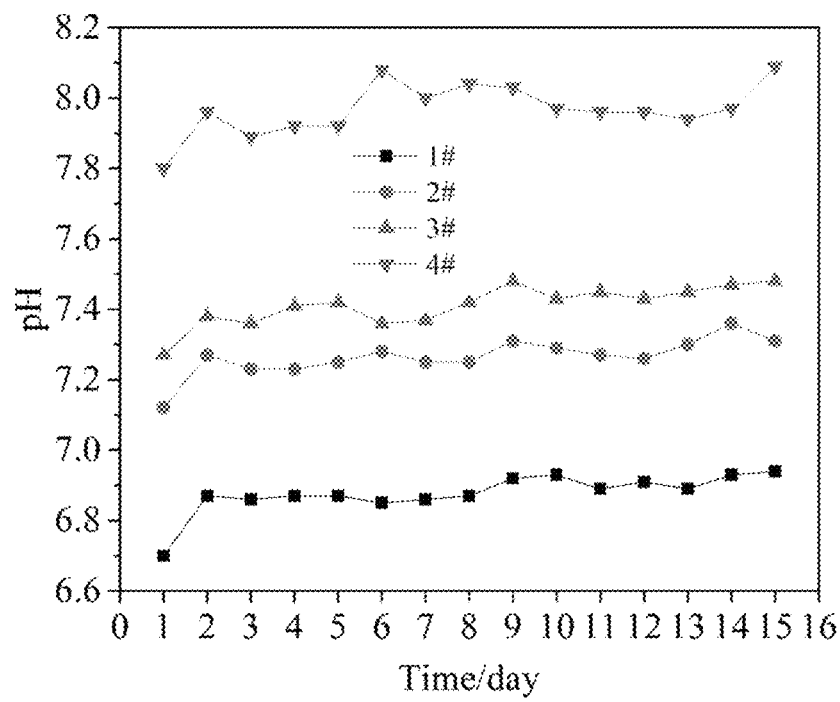
FIG. 8 is a diagram showing the change of pH when the e-SANI process is used to treat high ammonia-nitrogen wastewater at −1.0 V.
Figure 9:
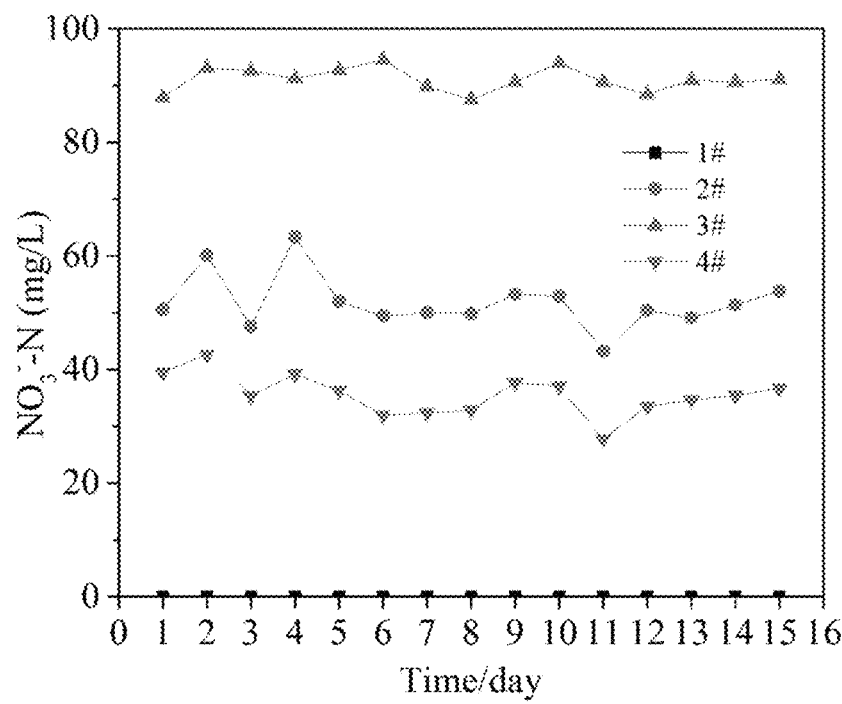
FIG. 9 is a diagram showing change of $NH4^+$—N when the e-SANI process is used to treat high ammonia-nitrogen wastewater at −1.0 V.
Figure 10:
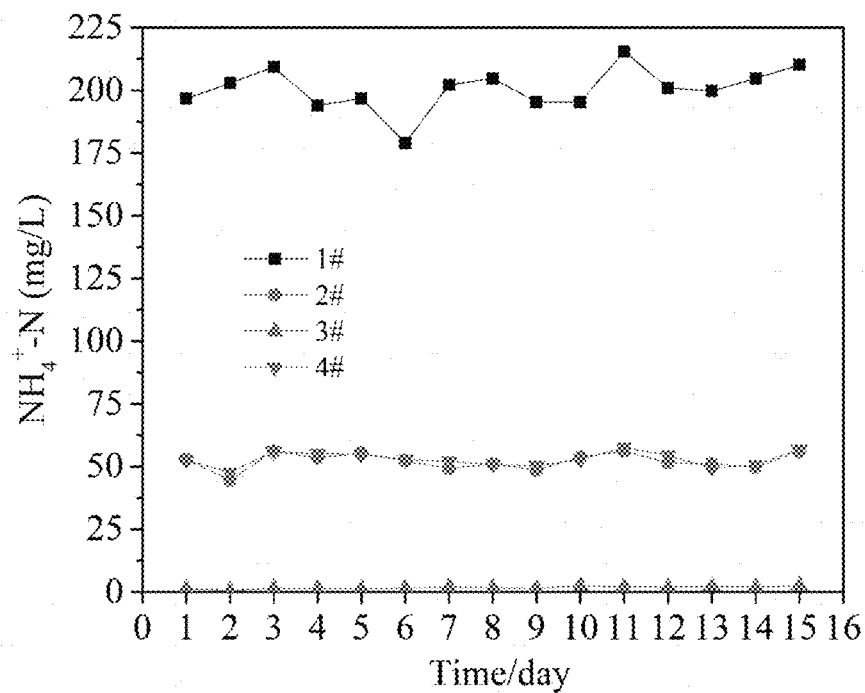
FIG. 10 is a diagram showing the change of $NO_3^-$—N when the e-SANI process is used to treat high ammonia-nitrogen wastewater at −1.0 V.

The results are as shown in FIGS. 8-10. After the cathode potential was further increased from −0.9 V to −1.0 V, the pH of the 2#, 3# and 4# chambers was further increased, so that the pH of the effluent could be stabilized between 7.0 and 7.2, the ammonia nitrogen of the effluent was almost zero, and the nitrification efficiency was stabilized at about 99%. Compared with the condition of −0.9 V, the difference in $NO_3^-$—N between 2# and 4# was further increased, which indicated that the denitrification effect of the 4# chamber was enhanced with the increase of the cathode potential, but the pH of the 4# chamber was close to 8.0, so the pH of 4# chamber has to be considered for further increase of the cathode potential.

Example 4

The wastewater treatment object was wastewater with a $NH_4^+$—N concentration of 214.6 mg/L, an $SO_4^{2-}$—S concentration of 200 mg/L and a TOC concentration of 400 mg/L. The initial pH was about 7.0.

The reflux ratio was controlled at 3:1, the hydraulic retention time of each chamber was controlled at 24 h, the operating temperature of the system was controlled at 25±5° C., and the cathode potential was controlled at −0.9V. The effluent was pumped into a MEC anode chamber (the 5# chamber) for deep sulfide oxidation removal.

Figure 11:
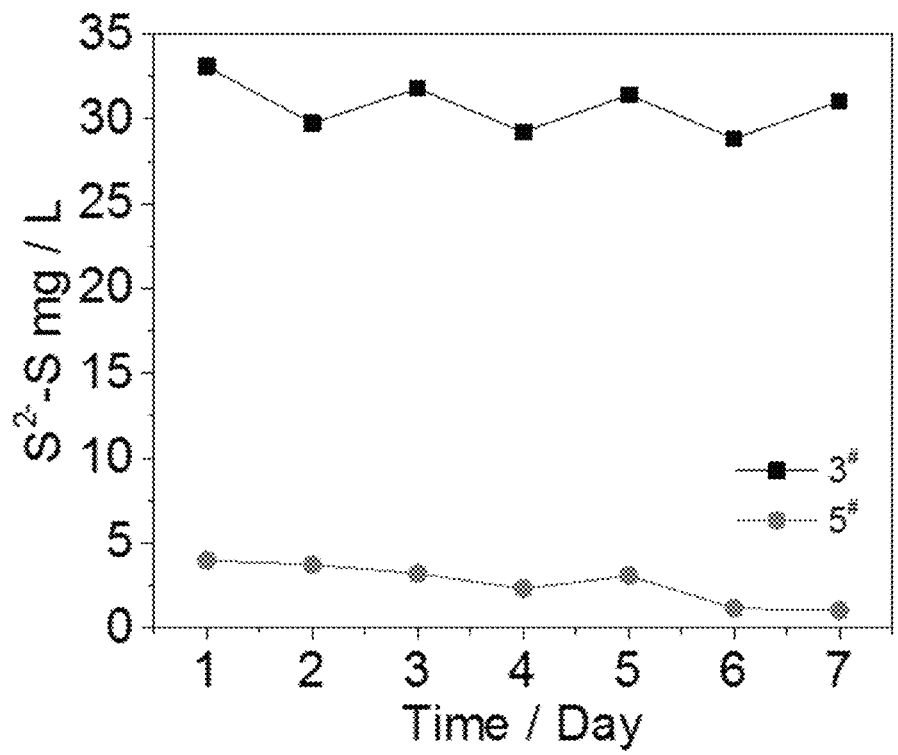
FIG. 11 is a schematic diagram of the processing result of Example 4.

The results are as shown in FIG. 11. After the effluent is further oxidized in the 5# chamber, the sulfide can be reduced from 30 mg/L to 1-2 mg/L, and the effect is remarkable.

What is claimed is:

1. A device for treating ammonia-nitrogen wastewater using a microbial electrolysis cell assisted sulfate reduction, autotrophic denitrification and nitrification integrated (SANI) system, comprising an SANI system, a cathode chamber, a anode chamber and a power supply, wherein the cathode chamber is a cathode chamber of an Microbial Electrolysis Cells (MEC), the anode chamber is an anode chamber of the MEC, and the cathode chamber and the anode chamber are separated by a separator; the cathode chamber and the anode chamber of the MEC are respectively connected to a negative electrode and a positive electrode of the power supply, and a cathode electrode in the cathode chamber is enriched with hydrogen autotrophic denitrifying bacteria,
wherein an outlet of a sulfide autotrophic denitrification chamber of the SANI system is connected to an inlet of the cathode chamber of the MEC; and an outlet of the cathode chamber of the MEC is connected to an inlet of a nitrification chamber of the SANI system.

2. The device for treating ammonia-nitrogen wastewater according to claim 1, wherein an outlet of the nitrification chamber of the SANI system is connected to the anode chamber of the MEC.

3. The device for treating ammonia-nitrogen wastewater according to claim 1, wherein the cathode chamber is filled with a graphite filler which is led out by a graphite rod to be connected to the power supply, and the anode chamber uses a Dimensionally Stable Anodes (DSA) electrode.

4. The device for treating ammonia-nitrogen wastewater according to claim 1, wherein the cathode chamber is in an anoxic condition, with a dissolved oxygen DO<0.5 mg/L; the anode chamber is in an aerobic condition, with a dissolved oxygen DO>0.5 mg/L; and the SANI system, the cathode chamber and the anode chamber are all fully stirred.

5. A method for treating ammonia-nitrogen wastewater by the device according to claim 1, comprising:
entering a wastewater through a bottom of a sulfate reduction chamber of the SANI system, and reducing sulfate in the wastewater to sulfide by sulfate reducing bacteria under a condition of complete mixing, during which electrons are sourced from organic substrates in the wastewater;

mixing an effluent from the sulfate reduction chamber and a wastewater flowing back from the nitrification chamber at a bottom of the sulfide autotrophic denitrification chamber of the SANI system; converting $NH_4^+$ in the wastewater into $NO_3^-$ by nitrifying bacteria in the nitrification chamber so that a large number of $NO_3^-$ exist in the sulfide autotrophic denitrification chamber, and converting $NO_3^-$ into $N_2$ under anaerobic conditions by sulfide autotrophic denitrification microorganisms growing in the sulfide autotrophic denitrification chamber, wherein electrons are sourced from sulfide coming from the sulfate reduction chamber; entering an effluent from the sulfide autotrophic denitrification chamber into the cathode chamber of the MEC, and isolating the anode chamber from the cathode chamber by the separator in order to avoid mutual interference between ion migration in the cathode chamber and that in the anode chamber; in the cathode chamber, performing denitrification for further denitrification by hydrogen autotrophic denitrifying bacteria, and then flowing an effluent from the cathode chamber through an upper outlet to the nitrification chamber to convert $NH_4^+$ in the water into $NO_3^-$; effectively neutralizing a large number of protons produced during nitrification in the nitrification chamber by a large number of hydroxyl radicals produced in the cathode chamber along with a hydrogen generating reaction; and finally, directly discharging or pumping an effluent from the nitration chamber into the anode chamber of the MEC for oxidation treatment to remove sulfide in the water to be directly discharged.

6. The method according to claim 5, wherein a flow ratio of an amount of water discharging from the nitrification chamber to an amount of water flowing back to the sulfide autotrophic denitrification chamber is 1:0.5-1:5.

7. The method according to claim 5, wherein temperatures of the SANI system, the cathode chamber and the anode chamber are controlled at 25±5° C., and a hydraulic retention time of each chamber is 18-36 h.

8. The method according to claim 5, wherein a cathode potential ranges from −0.4 V to −1.2 V.

9. The method according to claim 8, wherein an anode potential ranges from 0.5 V to 2.3 V.

* * * * *